United States Patent [19]

Hahn et al.

[11] Patent Number: 5,283,291

[45] Date of Patent: Feb. 1, 1994

[54] HIGH MODULUS RUBBER COMPOSITION

[75] Inventors: Bruce R. Hahn, Hudson; Wen-Liang Hsu, Copley; Douglas D. Callander, Akron; Adel F. Halasa, Bath, all of Ohio

[73] Assignee: The Goodyear Tire & Rubber Company, Akron, Ohio

[21] Appl. No.: 717,594

[22] Filed: Jun. 19, 1991

Related U.S. Application Data

[62] Division of Ser. No. 454,477, Dec. 21, 1989, Pat. No. 5,049,620.

[51] Int. Cl.$^5$ .................. C08L 9/00; C08L 23/16; C08L 7/00
[52] U.S. Cl. .................. 525/152; 525/132; 525/177; 525/184
[58] Field of Search .............. 525/132, 152, 177, 184

[56] References Cited

U.S. PATENT DOCUMENTS

| | | | |
|---|---|---|---|
| 4,141,863 | 2/1979 | Coran et al. | 260/3 |
| 4,207,404 | 6/1980 | Coran et al. | 525/184 |
| 4,386,186 | 5/1983 | Maresca | 525/68 |
| 4,686,262 | 8/1987 | Binsack et al. | 525/177 |
| 4,694,042 | 9/1987 | McKee et al. | 525/66 |
| 4,708,987 | 11/1987 | Hergenrother et al. | 525/184 |
| 4,810,753 | 3/1989 | Koga et al. | 525/183 |
| 4,937,290 | 6/1990 | Bauer | 525/184 |

FOREIGN PATENT DOCUMENTS

| | | |
|---|---|---|
| 1187648 | 9/1959 | France . |
| 1273185 | 8/1961 | France . |
| 2354369 | 1/1978 | France . |
| 886479 | 4/1961 | United Kingdom . |

*Primary Examiner*—Patricia A. Short
*Attorney, Agent, or Firm*—Alvin T. Rockhill

[57] ABSTRACT

It is desirable to increase the modulus of rubbers utilized in a wide variety of applications. This invention discloses a technique for preparing high modulus rubber compositions. By utilizing this technique, high modulus can be attained without sacrificing other properties, such as processability. The subject invention more specifically relates to a process for preparing a high modulus rubber composition which comprises: (1) polymerizing at least one diacid or diacid halide with at least one member selected from the group consisting of diols and diamines in a polymer cement of a rubbery elastomer under conditions which result in the formation of a rubber cement having a polyester or a polyamide dispersed therein; and (2) recovering the high modulus rubber composition from the rubber cement. It is highly desirable to make the high modulus rubber composition by interfacial polymerization.

13 Claims, No Drawings

HIGH MODULUS RUBBER COMPOSITION

This is a divisional of application Ser. No. 07/454,477, filed on Dec. 21, 1989, now U.S. Pat. No. 5,049,620.

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The subject invention reveals a technique for preparing a high modulus rubber composition. The high modulus rubber compositions made by this technique are well suited for applications where a high degree of stiffness is desired.

The subject invention specifically discloses a process for preparing a high modulus rubber composition which comprises: (1) polymerizing at least one diacid or diacid halide with at least one member selected from the group consisting of diols and diamines in a polymer cement of a rubbery elastomer under conditions which result in the formation of a rubber cement having a polyester or polyamide dispersed therein; and (2) recovering the high modulus rubber composition from the rubber cement. The high modulus rubber compositions prepared by this technique are highly dispersed blends of a polyester or polyamide in a rubbery elastomer. Polyamides are formed by the polymerization of a diacid or diacid halide with a diamine. Polyesters are produced by the polymerization of a diacid or diacid halide with a diol. The utilization of diacid halides, such as diacid chlorides, is generally preferred in the practice of this invention. Since the polymerization reaction is conducted in the polymer cement of an elastomer, a highly dispersed blend of the polyamide or polyester in the rubber is produced. The highly dispersed blend of the polyamide or polyester in the rubber can be recovered in dry form as a high modulus rubber composition.

The high modulus rubber compositions of this invention can also be prepared by reacting a diacid or diacid halide with a diol or diamine in the matrix of a dry rubber. Such polymerizations are typically conducted in an extruder or mixer wherein the dry rubber is subjected to shearing forces. Such a process is typically carried out by (1) mixing the diacid or diacid halide in a first portion of the rubber, (2) mixing the diol or diamine in a second portion of the rubber, and (3) mixing the rubber containing the diacid or diacid halide with the rubber containing the diol or diamine. When the diacid or diacid halide comes into contact with either the diol or the diamine, a polymerization resulting in the formation of a polyamide or polyester occurs. Because the process is carried out within the matrix of the dry rubber, a highly dispersed blend of the polyamide or polyester within the dry rubber results.

The subject patent application further reveals a process for preparing a high modulus rubber composition which comprises polymerizing at least one diacid halide with at least one member selected from the group consisting of diols and diamines within the matrix of at least one dry rubber to produce said high modulus rubber composition.

The high modulus rubber blends of this invention can also be made by interfacial polymerization. In fact, interfacial polymerization is a highly preferred technique for making such high modulus rubber compositions. It involves dissolving the diacid halide into a rubber cement (the solution of a rubber in a non-polar organic solvent) to make an organic phase. An aqueous solution is made by mixing the diol or diamine with water. It is normally desirable in the case of diamines to add a water soluble base to the aqueous solution. In the case of diols, it is essential to add a water soluble base to the aqueous solution. In many cases it is also beneficial to include a surfactant (including phase transfer agents) in the aqueous solution. The interfacial polymerization is carried out by mixing the organic and aqueous phases and providing agitation.

The subject invention more specifically discloses a process for preparing a high modulus rubber composition by interfacial polymerization which comprises: (1) preparing an aqueous phase which is comprised of (a) water and (b) a diol or a diamine; (2) preparing an organic phase which is comprised of (a) a rubber cement and (b) a diacid halide; (3) mixing the aqueous phase with the organic phase under conditions wherein agitation is provided and which are sufficient for polymerization to occur which results in the formation of a polyamide or polyester; and (4) recovering the high modulus rubber composition from the aqueous phase and organic phase.

The subject invention further reveals a process for preparing a high modulus rubber composition which comprises: (1) dispersing an aqueous phase which is comprised of (a) water and (b) a diol or a diamine throughout an organic phase which is comprised of (a) a rubber cement and (b) a diacid halide at a temperature and under conditions which result in the formation of a polyamide or polyester; and (2) recovering the high modulus rubber composition.

DETAILED DESCRIPTION OF THE INVENTION

Virtually any type of elastomer can be utilized in preparing the high modulus rubber compositions of this invention. The rubbers which are utilized in accordance with this invention typically contain repeat units which are derived from diene monomers, such as conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3- butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain repeat units which are derived from various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be modified by utilizing the techniques of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for utilization in modifying natural rubber, synthetic polyisoprene, and cis-1,4-polybutadiene.

The elastomers utilized in the high modulus rubber compositions of this invention can be made by solution polymerization, emulsion polymerization or bulk polymerization. It is, of course, also possible to use natural rubber in preparing the rubber compositions of this invention. In cases where a dry rubber is used to produce the high modulus rubber composition, the manner by which the dry rubber was synthesized is not of great importance. However, in the embodiment of this invention wherein a rubber cement is used in the preparation of the high modulus rubber composition, it is preferred for the rubber to be made by solution polymerization. In this scenario, it is not necessary to recover the rubber from the organic solvent in which it is dissolved. In other words, the rubber cement can be used in the process of this invention without first recovering the rubber in dry form. By doing so the unnecessary steps of removing the rubber from the organic solvent and redissolving it are eliminated. It is also possible to dissolve natural rubber or a rubber prepared by emulsion polymerization or bulk polymerization in an organic solvent so as to prepare a rubber cement which can be utilized in accordance with this invention.

It is generally preferred for the high modulus rubber compositions of this invention to be prepared by synthesizing a polyamide or polyester in the polymer cement of the rubbery elastomer. It is most preferred for the high modulus rubber composition to be made by interfacial polymerization. The polyamide or polyester is prepared by polymerizing at least one diacid or diacid halide with at least one diol or least one diamine. Such polymerizations result in the formation of a highly dispersed blend of the polyamide or polyester within the rubber cement. The organic solvent in the rubber cement can serve as the solvent for the monomers being polymerized as well as the solvent for the rubber. However, in many cases it will be desirable to employ a cosolvent for one or more of the monomers. For example, it is often beneficial to dissolve the monomers in a cosolvent and then to mix the monomer-cosolvent solution into the rubber cement. Methyl ethyl ketone, tetrahydrofuran, pyridine, methylene chloride, chloroform, and dimethylsulfoxide are some representative examples of polar organic solvents which can be employed as the cosolvent. Methylene chloride is a good cosolvent which can be used with terephthaloyl chloride monomer and pyridine is a good cosolvent which can be used with hydroquinone monomer.

Essentially homogeneous solutions of the polyamide or polyester and the rubbery elastomer in the organic solvent result from such polymerizations. Because the rubber cement containing the polyamide or polyester is essentially homogeneous in nature, highly dispersed blends of the polyamide or polyester in the rubbery elastomer can be recovered in dry form from the organic solvent. In other words, highly dispersed dry blends of the polyamide or polyester in the rubber can be prepared utilizing the technique of this invention. The organic solvent can be removed utilizing conventional techniques, such as coagulation or evaporation, to recover such highly dispersed blends.

The polymer cement can be prepared by polymerizing one or more diene monomers in a suitable inert organic solvent. The organic solvent utilized will normally be a saturated aliphatic hydrocarbon or an aromatic hydrocarbon. some representative examples of suitable aromatic solvents include benzene, toluene, xylene, ethylbenzene, diethylbenzene, isobutylbenzene, and the like. Some representative examples of suitable aliphatic solvents include n-hexane, cyclohexane, methylcyclohexane, isohexane, n-heptane, n-octane, isooctane, n-decane, 2,2-dimethylbutane, petroleum ether, kerosene, petroleum spirits, petroleum naphtha, and the like. However, it will normally be desirable to select a solvent which is inert with respect to the catalyst system which will be employed to initiate the polymerization reaction.

The rubber cement can be prepared by polymerizing one or more diene monomers in the organic solvent. As has been explained, the diene monomer utilized can be a conjugated or nonconjugated diene monomer. Vinyl-substituted aromatic monomers can also be copolymerized with one or more diene monomers into suitable rubbery elastomers, such as styrene-butadiene rubber (SBR).

High cis-1,4-polybutadiene can be prepared by polymerizing 1,3-butadiene monomer in an organic solvent in a continuous or batch polymerization process. A three-component nickel catalyst system which includes an inorgano aluminum compound, a soluble nickel containing compound, and a fluorine containing compound can be utilized to catalyze the polymerization.

The organoaluminum compound that can be utilized has the structural formula:

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H), and diethyl aluminum fluoride.

The component of the catalyst which contains nickel can be any soluble organonickel compound. These soluble nickel compounds are normally compounds of nickel with a mono-dentate or bi-dentate organic ligand containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthanate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis(π-allyl nickel), bis(πcycloocta-1,5-diene), bis(π-allyl nickel trifluoroacetate), and nickel tetracarbonyl. The preferred component containing nickel is a nickel salt of a carboxylic acid or an organic complex compound of nickel. Nickel naphthanate, nickel octanoate, and nickel neodecanoate are highly preferred soluble nickel containing compounds. Nickel 2-ethylhexanoate, which is commonly referred to as nickel octanoate (NiOct) is the soluble nickel containing compound which is most commonly used due to economic factors.

The fluorine containing compound utilized in the catalyst system is generally hydrogen fluoride or boron trifluoride. If hydrogen fluoride is utilized, it can be in the gaseous or liquid state. It, of course, should be anhydrous and as pure as possible. The hydrogen fluoride can be dissolved in an inert solvent, and thus, can be handled and charged into the reaction zone as a liquid solution. Optionally, butadiene monomer can be utilized as the solvent. Inert solvents include alkyl-, alkaryl-, arylalkyl-, and aryl-hydrocarbons. For example, benzene and toluene are convenient solvents.

The boron trifluoride component of the catalyst can be gaseous boron trifluoride. It should also be anhydrous and as pure as possible.

The hydrogen fluoride and/or boron trifluoride can also be utilized as complexes in the catalyst system as the fluorine containing compound. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitriles and water.

The ketone subclass can be defined by the formula

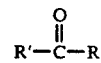

wherein R' and R are selected from the group consisting of alkyl radicals, cycloalkyl radicals, aryl radicals, alkaryl radicals, and arylalkyl radicals containing from 1 to about 30 carbon atoms;; and wherein R' and R can be the same or different. These ketones represent a class of compounds which have a carbon atom attached by a double bond to oxygen. Some representative examples of ketones that are useful in the preparation of the ketone-hydrogen fluoride complexes or boron trifluoride complexes of this invention include dimethyl ketone, methylethyl ketone, dibutyl ketone, methyl isobutyl ketone, ethyl octyl ketone, 2,4-pentanedione, butyl cycloheptanone, acetophenone amylphenyl ketone, butylphenyl ketone, benzophenone, phenyltolyl ketone, quinone and the like. The preferred ketones that can be used to form the ketone-hydrogen fluoride compounds and the ketone-boron trifluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex or boron trifluoride nitrile complex is the hydrogen fluoride benzonitrile complex or the boron trifluoride benzonitrile complex.

The alcohol subclass can be defined by the formula ROH where R represents alkyl radicals, cycloalkyl radicals, aryl radicals, alkaryl radicals, or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes and boron trifluoride complexes are methanol, ethanol, n-propanol, isopropanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl radicals, cycloalkyl radicals, aryl radicals, alkaryl radicals, and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether and the like. The preferred hydrogen fluoride-ether complexes or boron trifluoride-ether complexes are hydrogen fluoride diethyl etherate, hydrogen fluoride dibutyl etherate, boron trifluoride diethyl etherate, boron trifluoride dibutyl etherate complexes.

The ester subclass can be defined by the formula

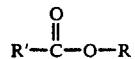

wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

Such complexes are usually prepared by simply bubbling gaseous boron trifluoride or hydrogen fluoride into appropriate amounts of the complexing agent, for instance, a ketone, an ether, an ester, an alcohol, or a nitrile. This should be done in the absence of moisture, and measures should be taken to keep the temperature from rising above about 100° F. (37.7° C.). In most cases, boron trifluoride and hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations can be determined by weight gain or chemical titration.

The three component catalyst system utilized can be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, acetylenic hydrocarbons, triolefins, vinyl ethers and aromatic nitriles.

Some representative examples of olefins that can be used as the preforming agent in the preparation of stabilized catalysts are trans-2-butene, mixed cis- and trans-2-pentene, and cis-2-pentene. Some nonconjugated diolefins that can be used as preforming agents are cis-1,4-hexadiene, 1,5-heptadiene, 1,7-octadiene, and the like. Representative examples of cyclic nonconjugated multiolefins that can be used include 1,5-cyclooctadiene, 1,5,9-cyclododecatriene, and 4-vinyl cyclohexene-1. Some representative examples of acetylenic hydrocarbons which can be used as the preforming agent are methyl acetylene, ethyl acetylene, 2-butyne, 1-pentyne, 2-pentyne, 1-octyne, and phenyl acetylene. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6-octadiene), and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene, and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound. The nickel compound is then added to the solution and then the fluoride compound is added to the solution. As an alternative, the preforming agent and the nickel compound may be mixed, followed by the addition of the organoaluminum compound and then the fluoride compound. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period, for example 15 to 30 minutes, at a moderate temperature, for example 50° C., increases the activity of the preformed catalyst greatly.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The three component nickel catalyst system can also be premixed. Such premixed catalyst systems are prepared in the presence of one or more polymeric catalyst stabilizers. The polymeric catalyst stabilizer can be in the form of a monomer, a liquid polymer, a polymer cement, or a polymer solution. Polymeric catalyst stabilizers are generally homopolymers of conjugated dienes or copolymers of conjugated dienes with styrenes and methyl substituted styrenes. The diene monomers used in the preparation of polymeric catalyst stabilizers normally contain from 4 to about 12 carbon atoms. Some representative examples of conjugated diene monomers that can be utilized in making such polymeric catalyst stabilizers include isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

Some representative examples of polymeric catalyst stabilizers include polyisoprene, polybutadiene, polypiperylene, copolymers of butadiene and styrene, copolymers of butadiene and α-methylstyrene, copolymers of isoprene and styrene, copolymers of isoprene and α-methylstyrene, copolymers of piperylene and styrene, copolymers of piperylene and α-methylstyrene, copolymers of 2,3-dimethyl-1,3-butadiene and styrene, copolymers of 2,3-dimethyl butadiene and α-methylstyrene, copolymers of butadiene and vinyltoluene, copolymers of 2,3-dimethyl-1,3-butadiene and vinyltoluene, copolymers of butadiene and β-methylstyrene, and copolymers of piperylene and β-methylstyrene.

In order to properly stabilize the catalyst system by this premixing technique, the polymeric catalyst stabilizer must be present before the organoaluminum compound has an opportunity to react with either the nickel compound or the fluorine containing compound. If the catalyst system is premixed without the presence of at least a small amount of polymeric catalyst stabilizer, the chemical effect of the organoaluminum compound upon the nickel compound or the fluoride compound is such that the catalytic activity of the catalyst system is greatly lessened and shortly thereafter rendered inactive. In the presence of at least a small amount of polymeric catalyst stabilizer, the catalytic or shelf life of the catalyst system is greatly improved over the same system without any polymeric catalyst stabilizer present.

One method of preparing this premixed catalyst system so that it will be highly active and relatively chemically stable is to add the organoaluminum compound to the polymer cement solution and mix thoroughly before the organoaluminum compound comes into contact with the nickel containing compound. The nickel compound is then added to the polymer cement solution. Alternatively, the nickel compound can be mixed with the polymer cement first, followed by the addition of the organoaluminum compound. Then the fluorine containing compound is added to the polymer cement solution. This is not intended to preclude other orders or methods of catalyst addition, but it is emphasized that the polymer stabilizer must be present before the organoaluminum compound has a chance to react with either the nickel containing compound or the fluorine containing compound.

The amount of polymeric catalyst stabilizer used to premix the catalyst system can be within the range of about 0.01 to 3 weight percent of the total amount of monomer to be polymerized. Expressed as a weight ratio of polymeric catalyst stabilizer to nickel, the amount of polymeric catalyst stabilizer present during the premixing step can be within the range of about 2 to 2000 times the concentration of nickel. The preferred weight ratio of polymeric catalyst stabilizer to nickel is from about 4:1 to about 300:1. Even though such premixed catalyst systems show catalytic activity immediately after being prepared, it has been observed that a short aging period, for example 15 to 30 minutes, at moderate temperatures, for example 50° C., increases the activity of the preformed catalyst system.

A "modified in situ" technique can also be used in making the three component nickel catalyst system. In fact, the utilization of catalysts made by such "modified in situ" techniques results in more uniform control of the polymerization and the polymeric product. In such a "modified in situ" technique, the organoaluminum compound is added to neat 1,3-butadiene monomer with the nickel containing compound being added later. The butadiene monomer containing the organoaluminum compound and the nickel containing compound is then charged into the reaction zone being used for the polymerization with the fluorine containing compound being charged into the reaction zone separately. Normally, the organoaluminum compound and the nickel containing compound are charged into the reaction zone soon after being mixed into the butadiene monomer. In most cases, the organoaluminum compound and the nickel containing compound are charged into the reaction zone within 60 seconds after being mixed in the butadiene monomer. It will generally be desirable to utilize organoaluminum compounds and nickel containing compounds which have been dissolved in a suitable solvent.

The three component nickel catalyst systems utilized in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range. Polymerizations can be carried out utilizing a mole ratio of the organoaluminum compound to the nickel containing compound within the range of from about 0.3:1 to about 300:1; with the mole ratio of the fluorine containing compound to the organonickel containing compound ranging from about 0.5:1 to about 200:1 and with the mole ratio of the fluorine containing compound to the organoaluminum compound ranging from about 0.4:1 to about 10:1. The preferred mole ratios of the organoaluminum compound to the nickel containing compound ranges from about 2:1 to about 80:1, the preferred mole ratio of the fluorine containing compound to the nickel containing compound ranges from about 3:1 to about 100:1, and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design, and other factors.

The three component nickel catalyst system can be continuously charged into the reaction zone utilized in carrying out continuous solution polymerization at a rate sufficient to maintain the desired catalyst concentration. The three catalyst components can be charged into the reaction zone "in situ", or as has been previously described, as a preformed or premixed catalyst system. In order to facilitate charging the catalyst components into the reaction zone "in situ" they can be dissolved in a small amount of an inert organic solvent or butadiene monomer. Preformed and premixed catalyst systems will, of course, already be dissolved in a solvent. The polymerization medium being utilized will normally contain about 5 weight percent to about 35 weight percent monomers and polymer with about 65 weight percent to 95 weight percent of the polymerization medium being solvent.

One or more molecular weight regulators can also be included in the polymerization medium. The molecular weight regulators which can be used include those which are known to be useful in solution polymerizations of 1,3-butadiene monomer which utilize nickel catalyst systems, such as those disclosed in U.S. Pat. No. 4,383,097 and South African Patents 83/2555, 83/2557 and 83/2558, which are incorporated herein by reference. These molecular weight regulators are selected from the group consisting of α-olefins, cis-2-butene, trans-2-butene, allene, 1,4-pentadiene, 1,5-hexadiene, 1,6-heptadiene, 1,2,4-trivinylcyclohexene, 1-trans-4-hexadiene, and 4-vinyl-1-cyclohexene. The α-olefins that can be utilized generally contain from 2 to about 10 carbon atoms. Some representative examples of α-olefins that can be utilized for this purpose include ethylene, propylene, 1-butene, 1-pentene, and 1-hexene. 1-butene is a preferred molecular weight regulator. This is because it has a boiling point of $-6.3°$ C. which is very close to the boiling point of 1,3-butadiene ($-4.5°$ C.) and because it is effective as a molecular weight regulator at low concentrations and is not a poison to the polymerization catalyst even if its concentration increases markedly.

The amount of molecular weight regulator that needs to be employed varies with the type of molecular weight regulator being utilized, with the catalyst system, with the polymerization temperature, and with the desired molecular weight of the polymer being synthesized. For instance, if a high molecular weight polymer is desired, then a relatively small amount of molecular weight regulator is required. On the other hand, in order to reduce molecular weights substantially, relatively larger amounts of the molecular weight regulator will be utilized. Generally, greater amounts of the molecular weight regulator are required when the catalyst system being utilized contains hydrogen fluoride or is an aged catalyst which contains boron trifluoride. Extremely effective molecular weight regulators, for example allene, can be used in lower concentrations and will nevertheless suppress molecular weights to the same degree as do more typical molecular weight regulators at higher concentrations. More specifically, allene will suppress the molecular weight of the polymer being synthesized in the solution polymerization when utilized at concentrations as low as 0.005 phm (parts per hundred parts of monomer). Generally, the molecular weight regulator will be utilized at a concentration ranging between about 0.005 phm and 20 phm. It will normally be preferred for the molecular weight regulator to be utilized at a concentration of 0.1 phm to 15 phm with the most preferred concentration being between 1 phm and 10 phm.

In continuous polymerizations, the molecular weight regulator is continuously charged into the reaction zone at a rate sufficient to maintain the desired concentration of the molecular weight regulator in the reaction zone. Even though the molecular weight regulator is not consumed in the polymerization reaction, a certain amount of molecular weight regulator will need to be continuously added to compensate for losses. The total quantity of the 1,3-butadiene monomer, the catalyst system, the solvent, and the molecular weight regulator (if desired) charged into the reaction zone per unit time is essentially the same as the quantity of high cis-1,4-polybutadiene cement withdrawn from the reaction zone within that unit of time.

High cis-1,4-polybutadiene can also be prepared under solution polymerization conditions utilizing rare earth catalyst systems, such as lathanide systems, which are normally considered to be "pseudo-living". Such rare earth catalyst systems are comprised of three components. These components include (1) an organoaluminum compound, (2) an organometallic compound which contains a metal from Group III-B of the Periodic System, and (3) at least one compound which contains at least one labile halide ion. The organoaluminum compound which can be utilized in conjunction with such rare earth catalyst systems are the same as those described for utilization in conjunction with the three component nickel catalyst system previously described.

In the organometallic compound which contains a metal from Group III-B of the Periodic System the metal ion forms the central core of atom to which ligand-type groups or atoms are joined. These compounds are sometimes known as coordination-type compounds. These compounds may be symbolically represented as $ML_3$ wherein M represents the above-described metal ions of Group III-B and L is an organic ligand containing from 1 to 20 carbon atoms selected from a group consisting of (1) o-hydroxyaldehydes, (2) o-hydroxyphenones, (3) aminophenols, (4) hydroxy esters, (5) hydroxy quinolines, (6) β-diketones, (7) monocarboxylic acids, (8) ortho dihydric phenols, (9) alkylene glycols, (10) dicarboxylic acids, (11) alkylated derivatives of dicarboxylic acids and (12) phenolic ethers.

The Group III-B metals which are useful in the organometallic compound include scandium, yttrium, the lanthanides, and the actinides. The lanthanides include lanthanum, cerium, praseodymium, neodymium, promethium, samarium, europium, gadolinium, terbium, dysprosium, holmium, erbium, thulium, ytterbium and lutetium. The actinides include actinium, thorium, protactinium, uranium, neptunium, plutonium, americium, curium, berkelium, californium, einsteinium, fermium, mendelerium, and lawrencium. The preferred actinides are thorium and uranium which have atomic numbers of 90 and 92, respectively. The preferred Group III-B metals are cerium, praseodymium, neodymium and gadolinium which have atomic numbers of 58, 59, 60, and 64 respectively. The most preferred lanthanide metal is neodymium.

In the organometallic compound utilized the organic portion includes organic type ligands or groups which contain from 1 to 20 carbon atoms. These ligands can be of the monovalent and bidentate or divalent and bidentate form. Representative of such organic ligands or groups are (1) o-hydroxyaldehydes such as salicylaldehyde, 2-hydroxyl-1-naphthaldehyde, 2-hydroxy-3-naphthaldehyde and the like; (2) o-hydroxyphenones such as 2'-hydroxyacetophenone, 2'-o-hydroxybutyrophenone, 2'-hydroxypropiophenone and the like; (3) aminophenols such as o-aminophenol, N-methyl o-aminophenol, N-ethyl o-aminophenol and the like; (4) hydroxy esters such as ethyl salicylate, propyl salicylate, butyl salicylate and the like; (5) phenolic compounds such as 2-hydroxyquinoline, 8-hydroxyquinoline and the like; (6) β-diketones such as acetylacetone, benzoylacetone, propionylacetone, isobutyrylacetone, valerylacetone, ethylacetylacetone and the like; (7) monocarboxylic acids such as acetic acid, propionic acid, valeric acid, hexanoic acid, 2-ethylhexanoic acid, neodecanoic acid, lauric acid, stearic acid and the like; (8) ortho dihydric phenols such as pyrocatechol; (9) alkylene glycols such as ethylene glycol, propylene glycol, trimethylene glycol, tetramethylene glycol and the like; (10) dicarboxylic acids such as oxalic acid, malonic acid, maleic acid, succinic acid, o-phthalic acid and the like; (11) alkylated derivatives of the above-described dicarboxylic acids; (12) phenolic ethers such as o-hydroxyanisole, o-hydroxyethyl phenol ether and the like.

Representative organometallic compounds of the Group III-B metals, corresponding to the formula $ML_3$, which may be useful in this invention include cerium acetylacetonate, cerium naphthenate, cerium neodecanoate, cerium octanoate, tris-salicylaldehyde cerium, cerium tris-(8-hydroxyquinolate), gadolinium naphthenate, gadolinium neodecanoate, gadolinium octanoate, lanthanum naphthenate, lanthanum octanoate, neodymium naphthenate, neodymium neodecanoate, neodymium octanoate, praseodymium naphthenate, prasodymium octanoate, yttrium acetylacetonate, yttrium octanoate, dysprosium octanoate, tris($\pi$-allyl) uranium chloride, tris($\pi$-allyl) uranium bromide, tris($\pi$-allyl) uranium iodide, uranium tetramethoxide, uranium tetraethoxide, uranium tetrabutoxide, uranium octanoate, thorium ethoxide, tris($\pi$-allyl) thorium chloride, thorium naphthenate, uranium isovalerate, and other Group III-B metals complexed with ligands containing form 1 to 20 carbon atoms.

The third catalyst component utilized in such rare earth catalyst systems is a compound which contains a halide ion. Some representative examples of halide ions which can be utilized include bromide ions, chloride ions, fluoride ions, and iodide ions. A combination of two or more of these ions can also be utilized. These halide ions can be introduced as (1) hydrogen halides; (2) alkyl, aryl, alkaryl, aralkyl and cycloalkyl metal halides wherein the metal is selected from the Groups II, III-A and IV-A of the Periodic Table; (3) halides of metals of Groups III, IV, V, VI-B and VIII of the Periodic Table and (4) organometallic halides corresponding to the general formula $ML_{(3-y)}X_y$ wherein M is a metal selected from the group consisting of metals of Group III-B of the Periodic Table having atomic numbers of 21, 39 and 57 through 71 inclusive; L is an organic ligand containing from 1 to 20 carbon atoms and selected from the group consisting of (a) o-hydroxyaldehydes, (b) o-hydroxyphenones, (c) hydroxyquinolines, (d) $\beta$-diketones, (e) monocarboxylic acids, (f) ortho dihydric phenols, (g) alkylene glycols, (h) dicarboxylic acids, (i) alkylated derivatives of dicarboxylic acids and (j) phenolic ethers; X is a halide ion and y is an integer ranging from 1 to 2 and representing the number of halide ions attached to the metal M. The organic ligand L may be of the monovalent and bidentate or divalent and bidentate form.

Representative examples of such compounds containing a labile halide ion include (1) inorganic halide acids, such as hydrogen bromide, hydrogen chloride and hydrogen iodide; (2) organometallic halides, such as ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) inorganic halides, such as aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like; and (4) organometallic (Group III-B) halides, such as t-butylsalicylaldehydrocerium (III) chloride, salicylaldehydrocerium (III) chloride, 5-cyclohexylsalicylaldehydrocerium (III) chloride, 2-acetylphenolatocerium (III) chloride, oxalatocerium (III) chloride, oxalatocerium (III) bromide and the like. The preferred compounds which contain a labile halide ion are inorganic halide acids and organometallic halides.

The rare earth metal catalyst system can be prepared using an "in situ" technique or it can be "preformed." By "in situ" is meant that the catalyst components are added separately to the monomer to be polymerized. By "preformed" is meant the manner in which the catalyst components are mixed together prior to exposure of any of the components to the monomer to be polymerized. It is also known that when employing the type of catalyst system described in this invention, the presence of monomer is not essential to the formation of an active catalyst species, thus, facilitating the use of "preformed" catalysts. Also, it is known that freshly "preformed" catalysts are frequently more active than catalysts which have been allowed to age before use. Greatly improved "preformed" catalysts can be prepared by carrying out the "preforming" in the presence of small amounts of conjugated diolefins. Preforming in the presence of monomers results in homogeneous (soluble) catalyst systems, whereas those prepared by mixing in the absence of monomers are frequently heterogeneous (insoluble). Such a "preforming" technique is described in detail in U.S. Pat. No. 3,794,604 which is incorporated herein by reference.

The proportions of the components of the polymerization catalyst compositions of this invention can be varied widely. When the halide ion of the halogen containing compound is bromide, chloride or iodide ion, the atomic ratio of the halide ion to the Group III-B metal can vary from about 0.1/1 to about 6/1. A more preferred ratio is from about 0.5/1 to about 3.5/1 and the most preferred ratio is about 2/1. However, when the halide ion of the halogen-containing compound is fluoride ion, the ratio of the fluoride ion to the Group III-B metal ion ranges from about 20/1 to about 80/1 with the most preferred ratio being about 30/1 to about 60/1. The molar ratio of the trialkylaluminum or alkylaluminum hydride to Group III-B metal can range from about 4/1 to about 200/1 with the most preferred range being from about 8/1 to about 100/1. The molar ratio of diolefin to Group III-B metal can range from about 0.2/1 to 3000/1 with the most preferred range being from about 5/1 to about 500/1.

The amount of rare earth catalyst charged to the reduction system can be varied over a wide range; the sole requirement being that a catalytic amount of the catalyst composition, sufficient to cause polymerization of the 1,3-butadiene monomer, be present in the reaction system. Low concentrations of catalyst are desirable in order to minimize ash problems. It has been found that polymerizations will occur when the catalyst level of the Group III-B metal varies between 0.05 and 1.0 millimole of Group III-B metal per 100 grams of monomer. A preferred ratio is between 0.1 and 0.3 millimole of Group III-B metal per 100 grams of monomer.

The concentration of the total catalyst system employed, of course, depends upon factors such as purity of the system, polymerization rate desired, temperature and other factors. Therefore, specific concentrations cannot be set forth except to say that catalytic amounts are used.

Temperatures at which such polymerization reactions employing rare earth catalyst systems are carried out can be varied over a wide range. Usually the temperature can be varied from extremely low temperatures such as $-60°$ C. up to high temperatures such as $150°$ C. or higher. Thus, temperatures is not a critical factor in the polymerization of 1,3-butadiene monomer with rare earth catalyst systems. It is generally preferred, however, to conduct the polymerization reaction at a temperature in the range of from about $10°$ C. to about $90°$ C. The pressure at which the polymerization is carried out can also be varied over a wide range. The reaction can be conducted at atmospheric pressure or, if desired, it can be carried out at subatmospheric or super-atmospheric pressure. Generally, a satisfactory polymerization is obtained when the reaction is carried out at about autogenous pressure, developed by the reactants under the operating conditions used.

Vinyl halides can be utilized in conjunction with rare earth catalyst systems as molecular weight regulators as described in U.S. Pat. No. 4,663,405 to Throckmorton which is incorporated herein by reference. The vinyl halides that can be utilized as molecular weight regulators include vinyl fluoride, vinyl chloride, vinyl bromide and vinyl iodide. Vinyl bromide, vinyl chloride and vinyl iodide are preferred. Generally, vinyl chloride and vinyl bromide are most preferred. The amount of vinyl halide utilized will vary with the molecular weight which is desired for the polymer being synthesized. Naturally, the use of greater quantities of the vinyl halide results in the production of a polymer having lower molecular weights. As a general rule, from about 0.05 to 10 phm (parts per hundred parts of monomer) of a vinyl halide will be utilized. In most cases from 0.1 phm to 2.5 phm of a vinyl halide will be present during the polymerization. Persons skilled in the art will be able to easily ascertain the amount of vinyl halide in order to produce a polymer having a specifically desired molecular weight.

Metals from Groups I and II of the Periodic System can also be utilized as catalysts for polymerizing 1,3-butadiene monomer into 1,4-polybutadiene. The utilization of initiator systems of this type results in the formation of "living" polymers. The metals which are most commonly utilized in initiator systems of this type include barium, lithium, magnesium, sodium, and potassium. Lithium and magnesium are the metals that are most commonly utilized in such initiator systems. The metal initiator systems which are most commonly utilized in polymerizing butadiene monomer into polybutadiene are in the form of organometallic compounds. For instance, lithium is commonly utilized to catalyze such polymerizations in the form of an organoaluminum compound. Such organoaluminum compounds generally having the structural formula: Li—R, wherein R represents an alkyl group containing from 1 to 20 carbon atoms. More commonly, the alkyl group in such alkyl lithium compounds will contain from 2 to 8 carbon atoms. For instance, butyl lithium is very commonly utilized as the initiator for such polymerizations.

It is possible to prepare polybutadiene cements utilizing catalyst systems other than those described herein. It is also contemplated that such polybutadiene cements can be utilized in preparing the blends of this invention. Rubber cements of other elastomers, such as polyisoprene, styrene-butadiene rubber (SBR) or styrene-isoprene-butadiene rubber (SIBR) can also be synthesized utilizing known solution polymerization techniques. Such rubber cements can, of course, also be utilized in preparing the highly dispersed blends of this invention.

The polyamide or polyester can be synthesized by simply adding a diacid or diacid chloride and a diamine or diol to the rubber cement. It is usually desirable to also add a polar organic solvent to the rubber cement. Such polar organic solvents should be good solvents for the diol or diamine and should also be miscible in the non-polar solvent in the rubber cement. Some representative examples of such polar organic solvents include methyl ethyl ketone, tetrahydrofuran, methylene chloride, chloroform, pyridine and dimethylsulfoxide. In many cases, it is desirable to dissolve the diol or diamine in the polar organic solvent and then to mix the solution of the diol or diamine into the rubber cement.

A stoichiometric amount of diacid or diacid chloride and diamine or diol will typically be added. The amount of monomers added will depend upon the desired level of incorporation of the polyamide or polyester in the highly dispersed blend being prepared. Typically an amount of monomers sufficient to prepare a blend containing from about 2 phr to about 50 phr (part per hundred parts of rubber) of the polyamide or polyester will be added. It is typically preferred for the highly dispersed blend to contain from about 5 phr to about 40 phr of polyamide or polyester. The most preferred amount of polyamide or polyester in the blend will depend upon the ultimate application of the high modulus rubber composition. As a general rule, amounts within the range of about 10 phr to about 30 phr are most preferred.

The solution of the monomers in the rubber cement will normally contain from about 5 weight percent to about 35 weight percent monomers and polymers, based upon the total weight of the polymerization medium (monomers, rubber, and solvent). The polymerization medium will preferably contain from about 10 percent to about 30 percent monomers and polymers. It will generally be more preferred for the polymerization medium to contain from about 15 weight percent to about 25 weight percent monomers and polymers. In commercial operations, the polymerization medium will typically contain about 20 weight percent monomers and polymers.

In the most highly preferred embodiment of this invention, the polyamide or polyester will be synthesized by interfacial polymerization. The polymerization medium used in such interfacial polymerizations is comprised of an aqueous phase and an organic phase. The aqueous phase is comprised of water and at least one diol or diamine monomer. The aqueous phase will also normally contain a water soluble base. Diamines can be employed so as to serve as both the base and a monomer. However, it is important to include a water soluble base in cases where diol monomers are employed. The water soluble base will usually be an inorganic base such as sodium hydroxide. It is highly desirable to include a surfactant in the aqueous phase in cases where diol monomers are being employed. Anionic surfactants are generally preferred for this purpose. Cationic phase transfer agents are also useful.

The organic phase is comprised of a rubber cement, optionally, a polar organic solvent and a diacid halide. The rubber cement is a solution of at least one rubber in at least one nonpolar organic solvent. The organic phase can be made by mixing the diacid halide into the rubber cement. The polar organic solvent used should be a good solvent for the diacid halide.

The interfacial polymerization is carried out by mixing the organic phase with the aqueous phase and providing agitation. The weight ratio of the organic phase to the aqueous phase will generally be within the range of about 10:90 to about 90:10 with a ratio of 30:70 to 70:30 being preferred. Such interfacial polymerizations can be conducted over a very wide temperature range from about 0° C. up to about 100° C. It is normally preferred for such polymerizations to be conducted at a temperature which is within the range of about 20° C. to about 50° C.

Virtually any type of diacid or diacid chloride can be used in making the high modulus rubber compositions of this invention. The diacids which can be employed will normally have the structural formula:

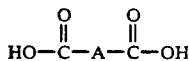

wherein A represents an alkylene group containing from 1 to about 12 carbon atoms or an arylene group containing from 6 to about 30 carbon atoms. Such alkylene groups will preferably contain from 2 to 10 carbon atoms. It is normally preferred for the diacid to be aromatic with terephthalic acid and isophthalic acid being highly preferred.

The diacid halides which can be utilized normally have the structural formula:

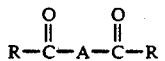

wherein A represents an alkylene group containing from 1 to about 12 carbon atoms or an arylene group containing from 6 to about 30 carbon atoms and wherein R represents a halogen atom. Such alkylene groups will preferably contain from 2 to 10 carbon atoms. The diacid halide will normally be a diacid fluoride, a diacid chloride or a diacid bromide. Diacid chlorides are normally preferred. It is normally preferred for the diacid chloride to be an aromatic diacid chloride, such as terephthaloyl chloride.

Polyamides can be prepared by reacting virtually any type of diamine monomer with the diacid or diacid chloride. The diamines which can be used normally have the structural formula: $H_2N-A-NH_2$ wherein A represents an alkylene group containing from 2 to about 30 carbon atoms or an arylene group containing from 6 to about 30 carbon atoms. Some representative examples of diamine monomers which can be utilized include ethylene diamine, phenylene diamine, 1,6-hexanediamine, neopentyl glycol, naphthalyne diamines, 1,4-butylene diamine, piperazine, hydrazine, and the like.

The diols which can be employed in making polyesters will generally have the structural formula: $HO-A-OH$ wherein A represents an alkylene group containing from about 6 to about 30 carbon atoms or an arylene group containing from 6 to about 30 carbon atoms. Some representative examples of diols which can be employed include 1,6-hexanediol, cyclohexane dimethanol, hydroquinone, resorcinol, bisphenol-A and the like.

In an alternative embodiment of this invention, polyamides can be synthesized in rubber cements by polymerizing monomers having the structural formula: $H_2N-R-COOH$, wherein R represents an alkylene group containing from 2 to about 30 carbon atoms or an arylene group containing from 6 to about 30 carbon atoms. It is normally desirable to catalyze such polymerizations with a catalyst system which is comprised of (1) a phosphorus containing compound, such as phenylphosphine dichloride, hexachlorocyclotriphosphatriazene, triphenylphosphine, or diphenyl chlorophosphate; and (2) at least one acid acceptor. Polymeric agents having pendant diphenylphosphine dichloride groups can also be used in conjunction with an acid acceptor as a catalyst system. Such catalyst systems are described in greater detail in U.S. Pat. No. 4,668,762 and by Kitayama, Sanui and Ogata, "Synthesis of Aromatic Polyesters by Direct Polycondensation with Triphenylphosphine Dichloride", 22 Journal of Polymer Science:Polymer Chemistry Edition 2705-2712 (1984) the teachings of which are incorporated herein by reference. Such direct polycondensation reactions can also be catalyzed by employing p-toluenesulfonyl chloride in the presence of N,N-dimethylformamide. Such a catalyst system is described in greater detail by Higashi, Akiyama, Takahashi and Koyama, "Direct Polycondensation of Aromatic Dicarboxylic Acids and Bisphenols with Tosylchloride and N,N-dimethylformamide in Pyridine", 22 Journal of Polymer Science:Polymer chemistry Edition 1653-1660 (1984) the teachings of which are hereby incorporated herein by reference.

The diacid halide monomer can be blended into the matrix of a dry rubber containing a diamine monomer or a diol monomer to prepare the high modulus rubber composition. In such a procedure it is normally preferred to mix the diamine monomer or diol monomer into the rubber and then subsequently to blend the diacid halide into the rubber which already contains the diamine monomer or diol monomer. It is also possible to reverse this order with the diacid halide monomer being mixed into the rubber with the diamine monomer or diol monomer being added subsequently. It is typically not desirable for the diacid halide monomer to be added to the dry rubber at the same time that the diol monomer or diamine monomer is being added.

In another preferred embodiment of this invention, the diacid halide is dispersed into a first portion of dry rubber. The diol monomer or diamine monomer is blended into a second portion of the rubber. The two components can then be blended so as to mix the rubber containing the diacid halide with the rubber containing the diol or diamine monomer. This procedure also results in the production of a highly dispersed blend of polyester or polyamide within the matrix of the dry rubber.

The polyester or polyamide can be synthesized in the rubber matrix or polymer cement solution over a wide temperature range from about 0° C. to about 100° C. As a matter of convenience, such solution polymerizations and interfacial polymerizations are typically conducted at room temperature with temperatures in the range of about 20° C. to about 50° C. being preferred. In cases where the polyester or polyamide is prepared within the matrix of a dry rubber, the temperature at which the polymerization is conducted will be above the melting point of the monomers (typically within the range of about 60° C. to about 200° C.). It is preferred for such polymerizations to be conducted at a temperature within the range of about 100° C. to about 160° C. with it being most preferred for the polymerization to be done at a temperature within the range of about 120° C. to about 140° C.

In cases where the polyester or polyamide is being synthesized within the matrix of a dry rubber, the polymerization is carried out while the rubber and monomers are being subjected to mechanical shearing forces. Typically the polymerization will be carried out in an extruder or a mixer which is capable of providing sufficiently high shearing forces so as to homogeneously disperse the monomers throughout the dry rubber. Banbury mixers and Brabender mixers are very suitable for utilization in this procedure.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLE 1

An elastomeric cement is prepared by dissolving 100 grams of polybutadiene rubber into toluene and diluting to one liter. Hydroxybenzoic acid (23 grams, 0.167 moles) is then mixed together with triphenylphosphine (48.1 grams, 0.18 moles) in 100 ml of dry pyridine. This solution is then added to the elastomer cement under a stream of nitrogen. A homogeneous solution is obtained. Hexachloroethane (59 grams, 0.25 moles) is then added to the mixture as a solution in a minimum amount of pyridine with rapid stirring. An exothermic reaction takes place and a white heterogeneous suspension develops. After one hour the resulting mixture is precipitated into an isopropanol/water solution, filtered and dried in a vacuum oven.

EXAMPLE 2

The elastomer cement is prepared as in Example 1. Terephthaloyl chloride (25.38 grams, 0.125 moles) as a solution in a minimum amount of methylene chloride is added to the elastomer cement to obtain a homogeneous solution. Hydroquinone (13.76 grams, 0.125 moles) in pyridine (30 ml) is then added dropwise to the cement with stirring. The viscosity increases and a white heterogeneous suspension is formed. After 3 hours the stirring is stopped and the mixture is precipitated into an isopropanol/water solution, filtered and dried in a vacuum oven.

EXAMPLE 3

A 27 gallon (102 liter) stainless steel reactor was charged with 100 lbs. (45.4 kg) of a 11% solution of cis-1,4-polyisoprene in hexane. Terephthaloyl chloride (1.9 kg, 9.35 moles) was then dissolved into the hexane at about 35° C. to achieve a homogeneous solution. An aqueous solution made up of 1.8 lbs. (0.82 kg) sodium hydroxide, 2.16 lbs. (0.98 kg) of hydroquinone and 0.1 lbs. (45 g) of surfactant in 1 gallon (3.8 liters) of water, was then added to the hexane solution. The resulting mixture was then stirred for approximately one hour. The hexane was driven off and the resulting sample was washed with water and dried to yield approximately 15.7 lbs. (7.1 kg) of composite material.

EXAMPLE 4

Natural rubber (230 grams) was added to a banbury mixer of 410 cc capacity at 100° C. The banbury was run until both the temperature and torque leveled off. Hexamethylene diamine (5.84 grams) was added to the mixer and allowed to mix with the natural rubber for approximately three minutes. Terephthaloyl chloride (10.20 grams) was then added to the mixer. The temperature and torque both increased significantly and the mixer was run for another 5 minutes. The resulting rubber composite was then removed from the mixture.

EXAMPLE 5

A one liter round bottom flask was charged with 252 grams of a 19% solution of polyisoprene in hexane. Terephthaloyl chloride (11.99 grams) was then added to the flask and the mixture was heated to 35° to dissolve the acid chloride. An aqueous solution was then prepared from hydroquinone (6.175 grams), sodium hydroxide (5.16 grams), and 30 ml of water. Tetrabutylammonium sulfate (1.0 gram) was added to the aqueous solution as a phase transfer agent. The resulting aqueous solution was then added under nitrogen to the hexane solution. The resulting mixture was then stirred for approximately two hours or until the polymerization was complete. The resulting suspension was then precipitated into an isopropanol/water solution, filtered and dried in a vacuum oven.

EXAMPLE 6

This experiment was conducted using the same procedure as was specified in Example 5 except that 0.27 g of ethoxylated sodium lauryl sulfate was added to the aqueous solution as a surfactant.

EXAMPLE 7

An elastomer cement consisting of 32.62 grams of SBR dissolved in 130.5 grams of hexane was charged into a one liter flask. Terephthaloyl chloride (11.88 grams) was then added to the flask. The resulting mixture was heated to 35° C. to dissolve the acid chloride. An aqueous solution was then prepared from p-aminophenol (6.14 grams), sodium hydroxide (4.68 grams), sodium lauryl sulfate (0.37 grams), and 50 ml of water. The aqueous solution was then added to the elastomer cement under nitrogen. The resulting mixture was then stirred for approximately 30 minutes. The resulting suspension of the polyesteramide in the elastomer cement was then coagulated into an isopropanol/water solution, filtered and dried in a vacuum oven to yield approximately 46 grams of composite material.

EXAMPLE 8

An elastomer cement consisting of polyisoprene (119.6 grams) in hexane (545 grams) was placed into a two liter kettle. Terephthaloyl chloride (42.31 grams) was then dissolved into the cement. An aqueous solution consisting of hexamethylene diamine (24.22 grams), sodium hydroxide (16.67 grams), ethoxylated sodium lauryl sulfate (1.0 grams), and 120 ml water was then added to the cement under nitrogen. The resulting mixture was vigorously stirred for ten minutes and then coagulated into an isopropanol/water solution, filtered and dried, resulting in approximately 300 grams of composite material.

EXAMPLE 9

An elastomer cement consisting of polyisoprene (91.79 grams) in hexane (418 grams) was charged into a two liter kettle. Terephthaloyl chloride (22.25 grams) was then dissolved into the cement. An aqueous solution consisting of bisphenol-A (25.01 grams), sodium hydroxide (9.2 grams), ethoxylated sodium lauryl sulfate (1.2 grams), and 100 ml water was then added to the cement with rapid stirring. The resulting suspension was then coagulated into an isopropanol/water solution, filtered and dried, resulting in 130 grams of composite material.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a high modulus rubber composition which consists essentially of: (1) polymerizing at least one diacid or diacid halide with at least one member selected from the group consisting of diols and diamines in a polymer cement of a polydiene rubber under conditions which result in the formation of a rubber cement having a polyester or polyamide dispersed therein; and (2) recovering the high modulus rubber composition from the rubber cement; wherein said process is conducted at a temperature which is within the range of about 20° C. to about 50° C.

2. A process as specified in claim 1 wherein the diol or diamine is dissolved in a polar organic solvent with the solution of the diol or diamine in the polar organic solvent being subsequently added to the rubber cement.

3. A process as specified in claim 2 wherein said diacid or diacid halide is a diacid halide.

4. A process as specified in claim 1 wherein the polydiene rubber is selected from the group consisting of natural rubber, synthetic polyisoprene and cis-1,4-polybutadiene.

5. A process as specified in claim 1 wherein the polymer cement is comprised of the polydiene rubber and an inert organic solvent.

6. A process as specified in claim 5 wherein said inert organic solvent is an aliphatic solvent.

7. A process as specified in claim 6 wherein said aliphatic solvent is hexane.

8. A process as specified in claim 5 wherein the polymer cement is further comprised of a polar organic solvent.

9. A process as specified in claim 8 wherein the polar organic solvent is selected from the group consisting of methyl ethyl ketone, tetrahydrofuran, methylene chloride, chloroform, pyridine, and dimethylsulfoxide.

10. A process as specified in claim 1 wherein said diacid or diacid halide is a diacid halide.

11. A process as specified in claim 10 wherein said diacid halide is a diacid chloride.

12. A process as specified in claim 1 wherein the amount of monomers is sufficient to result in the formation of a blend containing from about 5 to about 40 parts of the polyamide or polyester per 100 parts of the polydiene rubber.

13. A process as specified in claim 1 wherein the amount of monomers is sufficient to result in the formation of a blend containing from about 10 to about 30 parts of the polyamide or polyester per 100 parts of the polydiene rubber.

* * * * *